(12) United States Patent
Chang et al.

(10) Patent No.: US 12,590,846 B2
(45) Date of Patent: Mar. 31, 2026

(54) FOOD TEMPERATURE MEASURING DEVICE

(71) Applicant: RADIANT INNOVATION INC., Hsinchu County (TW)

(72) Inventors: Yung-Chang Chang, Hsinchu County (TW); Feng-Lien Huang, Hsinchu City (TW); Chih-Hsin Chen, Hsinchu County (TW)

(73) Assignee: RADIANT INNOVATION INC., Hsinchu County (TW)

( * ) Notice: Subject to any disclaimer, the term of this patent is extended or adjusted under 35 U.S.C. 154(b) by 1117 days.

(21) Appl. No.: 17/572,633

(22) Filed: Jan. 11, 2022

(65) Prior Publication Data

US 2023/0236069 A1 Jul. 27, 2023

(51) Int. Cl.
| | |
|---|---|
| G01K 1/04 | (2006.01) |
| G01K 1/02 | (2021.01) |
| G01K 1/024 | (2021.01) |
| G01K 1/06 | (2006.01) |

(52) U.S. Cl.
CPC ............. G01K 1/045 (2013.01); G01K 1/024 (2013.01); G01K 1/026 (2013.01); G01K 1/06 (2013.01); *G01K 2207/06* (2013.01)

(58) Field of Classification Search
CPC ........ G01K 1/045; G01K 1/024; G01K 1/026; G01K 1/06; G01K 2207/06
See application file for complete search history.

(56) References Cited

U.S. PATENT DOCUMENTS

| | | | | |
|---|---|---|---|---|
| 2003/0202558 A1* | 10/2003 | Chung | .................... | G01K 1/024 |
| | | | | 374/149 |
| 2010/0128753 A1* | 5/2010 | Claypool | ................. | G01K 1/14 |
| | | | | 374/102 |
| 2015/0179042 A1* | 6/2015 | Jeong | ......................... | F24C 7/08 |
| | | | | 340/584 |
| 2019/0246837 A1* | 8/2019 | Becker | .................... | G01K 13/00 |
| 2019/0364618 A1* | 11/2019 | Blum | .................... | H05B 1/0266 |

* cited by examiner

*Primary Examiner* — John E Breene
*Assistant Examiner* — Janice M Soto
(74) *Attorney, Agent, or Firm* — Li & Cai Intellectual Property Office

(57) ABSTRACT

A food temperature measuring device includes a device main body, a signal control module, a temperature measuring module, a light emitting display module, and an information display module. The temperature measuring module is configured for measuring a predetermined food so as to obtain measured temperature information of the predetermined food. The light emitting display module includes a first light emitting unit for providing a first food light message, a second light emitting unit for providing a second food light message, and a third light emitting unit for providing a third food light message. The information display module is configured for displaying a measured temperature value of the measured temperature information obtained by the temperature measuring module. Therefore, the light emitting display module can be configured for providing food category corresponding information corresponding to the predetermined food according to the first, the second, and the third food light message.

17 Claims, 12 Drawing Sheets

FOOD TEMPERATURE MEASURING DEVICE

FIELD OF THE DISCLOSURE

The present disclosure relates to a temperature measuring device, and more particularly to a food temperature measuring device.

BACKGROUND OF THE DISCLOSURE

A conventional food temperature measuring device can be used to measure a temperature of a food, but the conventional food temperature measuring device still has room for improvement in the related art.

SUMMARY OF THE DISCLOSURE

In response to the above-referenced technical inadequacy, the present disclosure provides a food temperature measuring device.

In one aspect, the present disclosure provides a food temperature measuring device, which includes a device main body, a signal control module, a temperature measuring module, a light emitting display module, and an information display module. The signal control module is disposed inside the device main body. The temperature measuring module is disposed on the device main body and electrically connected to the signal control module, for measuring a predetermined food so as to obtain measured temperature information of the predetermined food. The light emitting display module is disposed on the device main body and electrically connected to the signal control module. The information display module is disposed on the device main body and electrically connected to the signal control module, for displaying a measured temperature value of the measured temperature information that is obtained by the temperature measuring module. The light emitting display module includes a first light emitting unit for providing a first food light message, a second light emitting unit for providing a second food light message, and a third light emitting unit for providing a third food light message, and the light emitting display module is configured for providing food category corresponding information corresponding to the predetermined food according to the first food light message, the second food light message, and the third food light message.

In another aspect, the present disclosure provides a food temperature measuring device, which includes a device main body, a signal control module, a temperature measuring module, a light emitting display module, and an information display module. The signal control module is disposed inside the device main body. The temperature measuring module is disposed on the device main body and electrically connected to the signal control module, for measuring a predetermined food so as to obtain measured temperature information of the predetermined food. The light emitting display module is disposed on the device main body and electrically connected to the signal control module. The information display module disposed on the device main body and electrically connected to the signal control module, for displaying a measured temperature value of the measured temperature information that is obtained by the temperature measuring module, and for providing background color information that is displayed by a first color backlight or a second color backlight. When the measured temperature value of the measured temperature information that is obtained by the temperature measuring module falls within a safe temperature range, the first color backlight is shown on the information display module for displaying the background color information. When the measured temperature value of the measured temperature information that is obtained by the temperature measuring module falls within an unsafe temperature range, the second color backlight is shown on the information display module for displaying the background color information.

Therefore, in the food temperature measuring device provided by the present disclosure, by virtue of the temperature measuring module being configured for measuring a predetermined food so as to obtain measured temperature information of the predetermined food, the information display module being configured for displaying a measured temperature value of the measured temperature information that is obtained by the temperature measuring module, and the light emitting display module including a first light emitting unit for providing a first food light message, a second light emitting unit for providing a second food light message, and a third light emitting unit for providing a third food light message, the light emitting display module can be configured for providing food category corresponding information corresponding to the predetermined food according to the first food light message, the second food light message, and the third food light message.

Furthermore, in the food temperature measuring device provided by the present disclosure, by virtue of the temperature measuring module being configured for measuring a predetermined food so as to obtain measured temperature information of the predetermined food, the information display module being configured for displaying a measured temperature value of the measured temperature information that is obtained by the temperature measuring module, and the information display module being configured for providing background color information that is displayed by a first color backlight or a second color backlight, when the measured temperature value of the measured temperature information that is obtained by the temperature measuring module falls within a safe temperature range, the first color backlight can be shown on the information display module for displaying the background color information, and when the measured temperature value of the measured temperature information that is obtained by the temperature measuring module falls within an unsafe temperature range, the second color backlight can be shown on the information display module for displaying the background color information.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
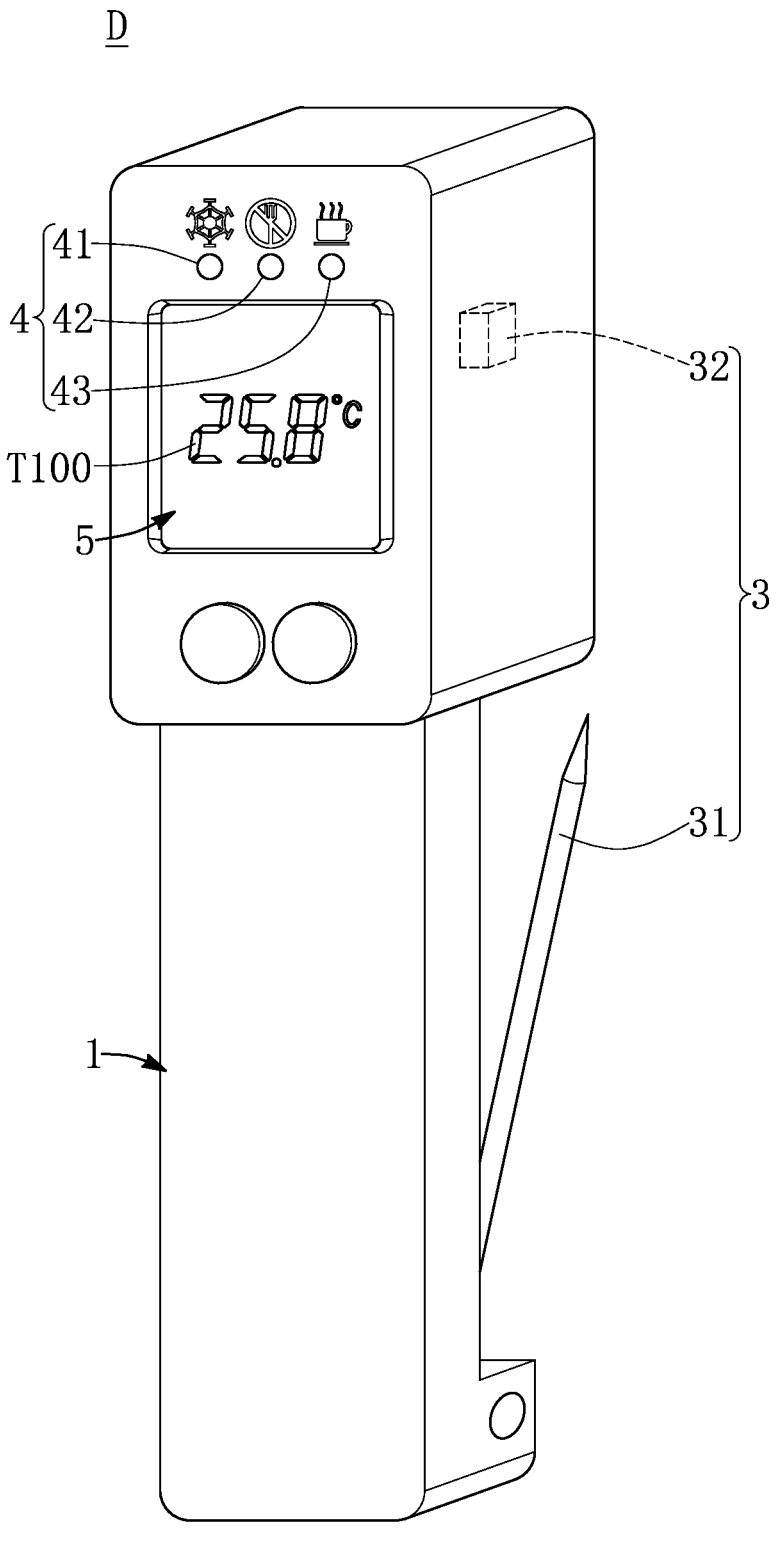
FIG. 1 is a schematic perspective view of a food temperature measuring device according to a first embodiment and a second embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 7, a first embodiment of the present disclosure provides a food temperature measuring device D, which includes a device main body 1, a signal control module 2, a temperature measuring module 3, a light emitting display module 4, and an information display module 5.

Figure 2:
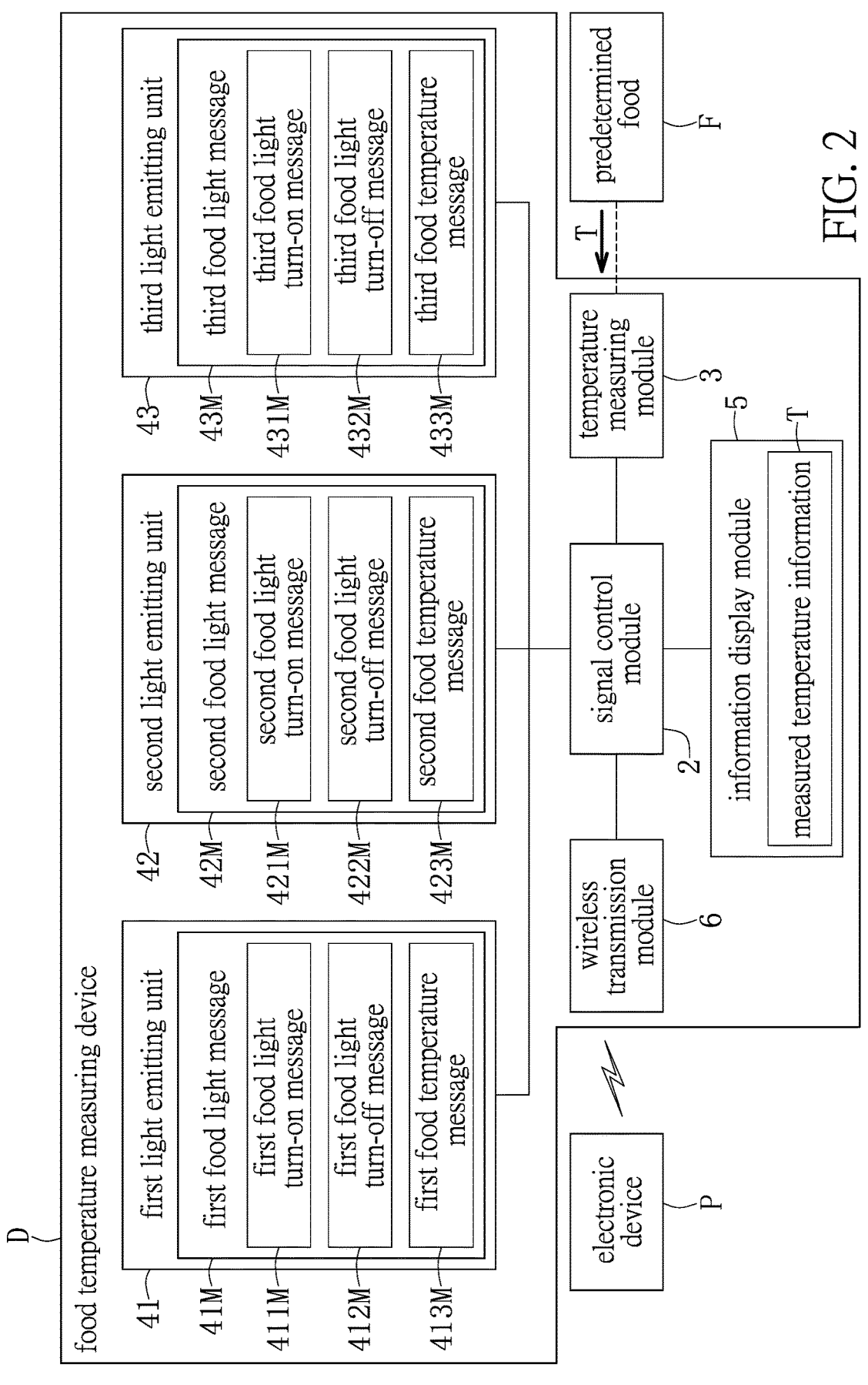
FIG. 2 is a functional block diagram of the food temperature measuring device according to the first embodiment and the second embodiment of the present disclosure.

Firstly, referring to FIG. 1 and FIG. 2, the signal control module 2 is disposed inside the device main body 1. The temperature measuring module 3 is disposed on the device main body 1 and electrically connected to the signal control module 2, and temperature measuring module 3 can be configured for measuring a predetermined food F (or a predetermined food material, or a predetermined food product) so as to obtain measured temperature information T of the predetermined food F. For example, as shown in FIG. 1, the temperature measuring module 3 includes a contact temperature measuring probe 31 (such as a pivotal temperature probe) disposed on the device main body 1, and a noncontact temperature measuring probe 32 (such as a far infrared sensor) disposed inside the device main body 1, and the noncontact temperature measuring probe 32 can be omitted according to different requirements. However, the aforementioned details are disclosed for exemplary purposes only, and are not meant to limit the scope of the present disclosure.

Figure 3:
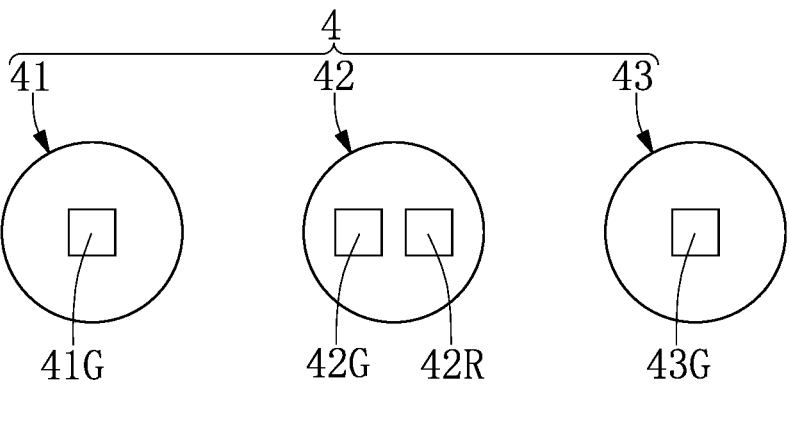
FIG. 3 is a schematic view of a light emitting display module of the food temperature measuring device including a first light emitting unit, a second light emitting unit, and a third light emitting unit according to the first embodiment of the present disclosure.

Moreover, referring to FIG. 1, FIG. 2 and FIG. 3, the light emitting display module 4 is disposed on the device main body 1 and electrically connected to the signal control module 2. The information display module 5 is disposed on the device main body 1 and electrically connected to the signal control module 2, and the information display module 5 can be configured for displaying a measured temperature value T100 of the measured temperature information T that is obtained (or measured) by the temperature measuring module 3. In addition, the light emitting display module 4 includes a first light emitting unit 41 for providing a first food light message 41M, a second light emitting unit 42 for providing a second food light message 42M, and a third light emitting unit 43 for providing a third food light message 43M, and the light emitting display module 4 can be configured for providing food category corresponding information corresponding to the predetermined food F according to different permutations (or arrangements) of the first food light message 41M, the second food light message 42M, and the third food light message 43M. For example, as shown in FIG. 3, the first light emitting unit 41 includes a first green light emitting element 41G for providing the first food light message 41M, the second light emitting unit 42 includes a red light emitting element (i.e., a second red light emitting element 42R), and a second green light emitting element 42G for providing the second food light message 42M, and the third light emitting unit 43 includes a third green light emitting element 43G for providing the third food light message 43M. In addition, the first green light emitting element 41G, the second red light emitting element 42R, the second green light emitting element 42G, and the third green light emitting element 43G can be light-emitting diode (LED) chips or any light-emitting components for generating light sources. However, the aforementioned details are disclosed for exemplary purposes only, and are not meant to limit the scope of the present disclosure.

Figure 4:
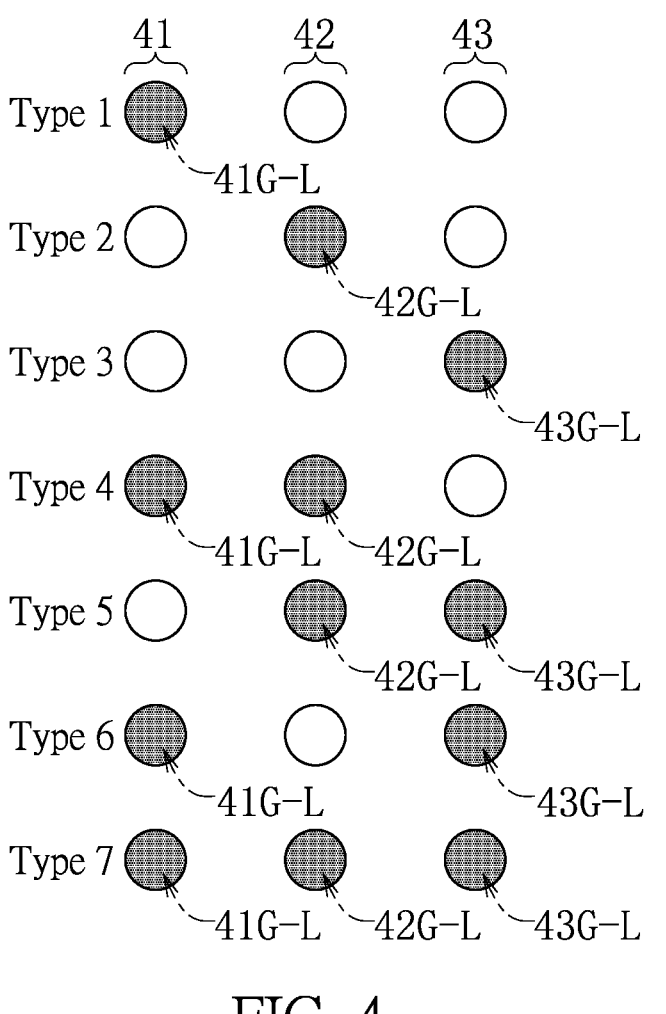
FIG. 4 is a schematic view of the light emitting display module of the food temperature measuring device configured for generating a first green light source, a second green light source, and a third green light source so as to provide seven different permutations therewith according to the first embodiment of the present disclosure.

More particularly, referring to FIG. 2, FIG. 3 and FIG. 4, the first food light message 41M that is provided by the first light emitting unit 41 includes a first food light turn-on message 411M that is used for indicating that the first light emitting unit 41 has been turned on, and a first food light turn-off message 412M that is used for indicating that the first light emitting unit 41 has been turned off. Moreover, the second food light message 42M that is provided by the second light emitting unit 42 includes a second food light turn-on message 421M that is used for indicating that the second light emitting unit 42 has been turned on, and a second food light turn-off message 422M that is used for indicating that the second light emitting unit 42 has been turned off. In addition, the third food light message 43M that is provided by the third light emitting unit 43 includes a third food light turn-on message 431M that is used for indicating that the third light emitting unit 43 has been turned on, and a third food light turn-off message 432M that is used for indicating that the third light emitting unit 43 has been turned off. Therefore, the food category corresponding information that is provided by the light emitting display module 4 can include one of the first food light turn-on message 411M and the first food light turn-off message 412M that are provided by the first light emitting unit 41, one of the second food light turn-on message 421M and the second food light turn-off message 422M that are provided by the second light emitting unit 42, and one of the third food light turn-on message 431M and the third food light turn-off message 432M that are provided by the third light emitting unit 43.

For example, referring to FIG. 2, FIG. 3 and FIG. 4, the first food light turn-on message 411M can be a first green light source 41G-L that is generated by the first green light emitting element 41G, the second food light turn-on message 421M can be a second green light source 42G-L that is generated by the second green light emitting element 42G, and the third food light turn-on message 431M can be a third green light source 43G-L that is generated by the third green light emitting element 43G. In addition, referring to FIG. 3 and FIG. 4, when the first green light emitting element 41G, the second green light emitting element 42G, and the third green light emitting element 43G are selectively turned on (as indicated by "ON" or "●") or turned off (as indicated by "OFF" or "○"), the first green light source 41G-L, the second green light source 42G-L, and the third green light source 43G-L can match with each other to provide seven different permutations (i.e., including types 1-7 or categories 1-7 as shown in the following Table 1, and FIG. 4). Therefore, the light emitting display module 4 can be configured for providing the food category corresponding information corresponding to the predetermined food F (such as using seven different permutations for respectively indicating seven different predetermined foods F) by turning on or off the first green light emitting element 41G, turning on or off the second green light emitting element 42G, and turning on or off the third green light emitting element 43G. However, the aforementioned details are disclosed for exemplary purposes only, and are not meant to limit the scope of the present disclosure.

TABLE 1

| | First green light emitting element | Second green light emitting element | Third green light emitting element |
|---|---|---|---|
| Type 1 | ON (●) | OFF (○) | OFF (○) |
| Type 2 | OFF (○) | ON (●) | OFF (○) |
| Type 3 | OFF (○) | OFF (○) | ON (●) |
| Type 4 | ON (●) | ON (●) | OFF (O) |
| Type 5 | OFF (○) | ON (●) | ON (●) |
| Type 6 | ON (●) | OFF (○) | ON (●) |
| Type 7 | ON (●) | ON (●) | ON (●) |

It should be noted that, referring to FIG. 2 and FIG. 3, the food temperature measuring device D can be configured to define a food cooked temperature corresponding to the predetermined food F by setting the first light emitting unit 41 (such as turning the first green light emitting element 41G on or off as shown in Table 1), setting the second light emitting unit 42 (such as turning the second green light emitting element 42G on or off as shown in Table 1), and setting the third light emitting unit 43 (such as turning the third green light emitting element 43G on or off as shown in Table 1). In addition, when the measured temperature value T100 of the measured temperature information T that is obtained or measured by the temperature measuring module 3 of the food temperature measuring device D gradually approaches the food cooked temperature of the predetermined food F, a flicker frequency of the light source generated by one of the first green light emitting element 41G, the second green light emitting element 42G, and the third green light emitting element 43G is gradually increased. For example, when the type 1 (ON/OFF/OFF) is represented as a "beef (i.e., the predetermined food F)," a user can set the light-emitting display module 4 so as to turn on the first green light-emitting element 41G (shown as an ON state) and turn off the second green light-emitting element 42G (shown as an OFF state) and the third green light-emitting element 43G (shown as an OFF state). In addition, when the beef is heated to sequentially present different heating states such as a rare state (about 49° C.), a medium-rare state (about 52° C.), a medium state (about 57° C.), a medium-well state (about 66° C.) and a well-done state (about 71° C.), the flicker frequency of the light source that is generated by the first green light-emitting element 41G is gradually increased so as to provide current heating state information (or current cooking state information) of the beef for the user according to the heating temperature that is gradually increased (i.e., according to the different heating states).

However, the aforementioned details are disclosed for exemplary purposes only, and are not meant to limit the scope of the present disclosure.

It should be noted that, as shown in FIG. 2, the food temperature measuring device D of the first embodiment of the present disclosure further includes a wireless transmission module 6 disposed on the device main body 1 and electrically connected to the signal control module 2. For example, the wireless transmission module 6 can be configured to transmit the measured temperature information T and the food category corresponding information to an electronic device P so as to record usage state information of the food temperature measuring device D. However, the aforementioned details are disclosed for exemplary purposes only, and are not meant to limit the scope of the present disclosure.

It should be noted that, referring to FIG. 2, FIG. 3, FIG. 5, FIG. 6 and FIG. 7, the first light emitting unit 41 can also be configured for providing a first food temperature message 413M by the first green light emitting element 41G, the second light emitting unit 42 can also be configured for providing a second food temperature message 423M by the second red light emitting element 42R, and the third light emitting unit 43 can also be configured for providing a third food temperature message 433M by the third green light emitting element 43G. For example, as shown in FIG. 1, the device main body 1 has a frozen pattern, an inedible pattern, and an edible pattern respectively proximate to and corresponding to the first light emitting unit 41, the second light emitting unit 42, and the third light emitting unit 43. In addition, referring to FIG. 3 and FIG. 5, when the measured temperature value T100 of the measured temperature information T is less than 4° C., the first green light emitting element 41G is turned on (as indicated by "●" in FIG. 5) for generating a first green light source 41G-L (the first green light source 41G-L means that the temperature of the predetermined food F is within a safe temperature range according to the specification of Hazard Analysis Critical Control Point (HACCP)), and the second green light emitting element 42G, the second red light emitting element 42R, and the third green light emitting element 43G are turned off (as indicated by "○" in FIG. 5). Moreover, referring to FIG. 3 and FIG. 6, when the measured temperature value T100 of the measured temperature information T is between 4° C. and 60° C., the second red light emitting element 42R is turned on (as indicated by "●" in FIG. 6) for generating a red light source (i.e., a second red light source 42R-L, the second red light source 42R-L means that the temperature of the predetermined food F is within an unsafe temperature range according to the specification of HACCP), and the first green light emitting element 41G, the second green light emitting element 42G, and the third green light emitting element 43G are turned off (as indicated by "○" in FIG. 6). Furthermore, referring to FIG. 3 and FIG. 7, when the measured temperature value T100 of the measured temperature information T is greater than 60° C., the third green light emitting element 43G is turned on (as indicated by "●" in FIG. 7) for generating a third green light source 43G-L (third green light source 43G-L means that the temperature of the predetermined food F is within a safe temperature range according to the specification of HACCP), and the first green light emitting element 41G, the second green light emitting element 42G, and the second red light emitting element 42R are turned off (as indicated by "○" in FIG. 7). However, the aforementioned details are disclosed for exemplary purposes only, and are not meant to limit the scope of the present disclosure.

It should be noted that when a placement orientation of the information display module 5 is changed according to different measurement angles of the food temperature measuring device D, a screen orientation (or a viewing orientation) of an information display image (such as the measured temperature information T) provided by the information display module 5 can be changed following a change of the placement orientation of the information display module 5. Hence, it is very convenient for the user to capture the information display image provided by the information display module 5 when the placement orientation of the information display module 5 of the food temperature measuring device D is changed.

Second Embodiment

Referring to FIG. 1, FIG. 2, FIG. 4, FIG. 8 and FIG. 9, a second embodiment of the present disclosure provides a food temperature measuring device D, which includes a device main body 1, a signal control module 2, a temperature measuring module 3, a light emitting display module 4, and an information display module 5. Comparing FIG. 8 with FIG. 3, and comparing FIG. 9 with FIG. 4, the main difference between the second embodiment and the first embodiment is as follows: in the second embodiment, the first light emitting unit 41 includes a first green light emitting element 41G for providing the first food light message 41M, and a first red light emitting element 41R for providing the first food light message 41M, the second light emitting unit 42 includes a second green light emitting element 42G for providing the second food light message 42M, and a second red light emitting element 42R for providing the second food light message 42M, and the third light emitting unit 43 includes a third green light emitting element 43G for providing the third food light message 43M, and a third red light emitting element 43R for providing the third food light message 43M.

Figure 8:
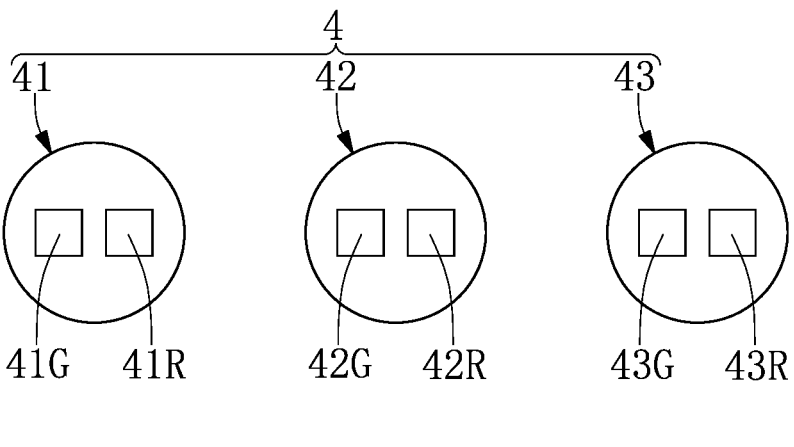
FIG. 8 is a schematic view of a light emitting display module of the food temperature measuring device including a first light emitting unit, a second light emitting unit, and a third light emitting unit according to the second embodiment of the present disclosure.

More particularly, referring to FIG. 4 and FIG. 8, when the first food light turn-on message 411M is a first green light source 41G-L that is generated by the first green light emitting element 41G, the second food light turn-on message 421M is a second green light source 42G-L that is generated by the second green light emitting element 42G, and the third food light turn-on message 431M is a third green light source 43G-L that is generated by the third green light emitting element 43G, the light emitting display module 4 can be configured for providing the food category corresponding information corresponding to the predetermined food F by turning on or off the first green light emitting element 41G, turning on or off the second green light emitting element 42G, and turning on or off the third green light emitting element 43G. For example, as shown in FIG. 4, when the first green light emitting element 41G, the second green light emitting element 42G, and the third green light emitting element 43G are selectively turned on (as indicated by "ON" or "●") or turned off (as indicated by "OFF" or "○"), the first green light source 41G-L, the second green light source 42G-L, and the third green light source 43G-L can match with each other to provide seven different permutations (i.e., including types 1-7 as shown in the foregoing Table 1, and FIG. 4). However, the aforementioned details are disclosed for exemplary purposes only, and are not meant to limit the scope of the present disclosure.

Figure 9:
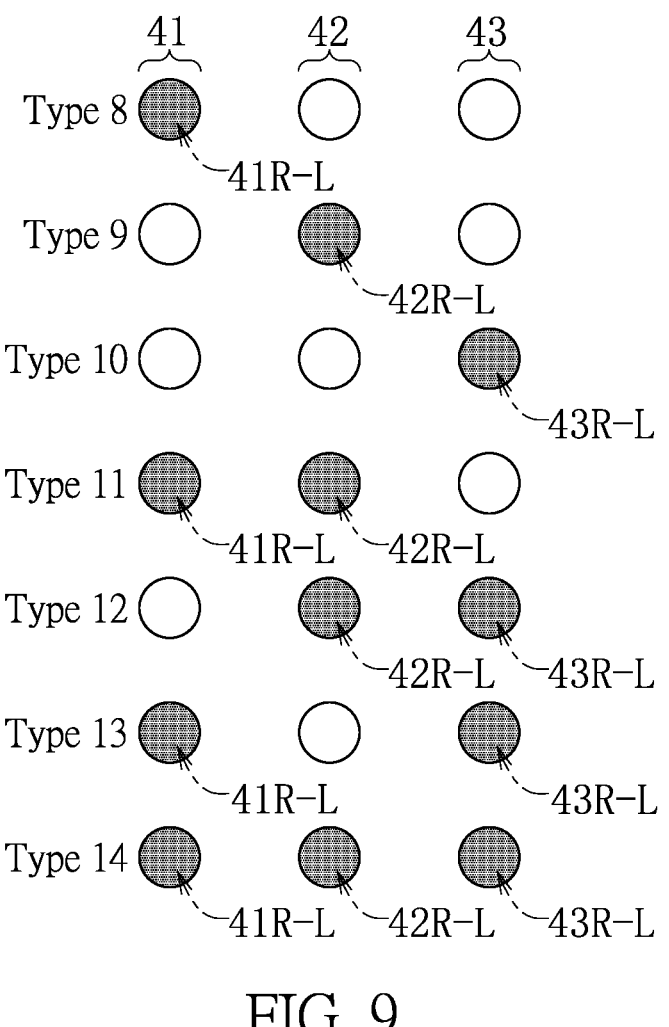
FIG. 9 is a schematic view of the light emitting display module of the food temperature measuring device configured for generating a first red light source, a red green light source, and a third red light source so as to provide seven different permutations therewith according to the second embodiment of the present disclosure.

More particularly, referring to FIG. 8 and FIG. 9, when the first food light turn-on message 411M is a first red light source 41R-L that is generated by the first red light emitting element 41R, the second food light turn-on message 421M is a second red light source 42R-L that is generated by the second red light emitting element 42R, and the third food light turn-on message 431M is a third red light source 43R-L that is generated by the third red light emitting element 43R, the light emitting display module 4 can be configured for providing the food category corresponding information corresponding to the predetermined food F by turning on or off the first red light emitting element 41R, turning on or off the second red light emitting element 42R, and turning on or off the third red light emitting element 43R. For example, as shown in FIG. 9, when the first green light emitting element 41G, the second green light emitting element 42G, and the third green light emitting element 43G are selectively turned on (as indicated by "ON" or "⊙") or turned off (as indicated by "OFF" or "○"), the first red light source 41R-L, the second red light source 42R-L, and the third red light source 43R-L can match with each other to provide another seven different permutations (i.e., including types 8-14 as shown in the following Table 2, and FIG. 9). However, the aforementioned details are disclosed for exemplary purposes only, and are not meant to limit the scope of the present disclosure.

TABLE 2

|  | First red light emitting element | Second red light emitting element | Third red light emitting element |
|---|---|---|---|
| Type 8 | ON (●) | OFF (○) | OFF (○) |
| Type 9 | OFF (○) | ON (●) | OFF (○) |
| Type 10 | OFF (○) | OFF (○) | ON (●) |
| Type 11 | ON (●) | ON (●) | OFF (○) |
| Type 12 | OFF (○) | ON (●) | ON (●) |
| Type 13 | ON (●) | OFF (○) | ON (●) |
| Type 14 | ON (●) | ON (●) | ON (●) |

It should be noted that, for example, the food temperature measuring device D of the second embodiment can be configured to define a food cooked temperature corresponding to the predetermined food F by setting the first light emitting unit 41, the second light emitting unit 42, and the third light emitting unit 43. In addition, when the measured temperature value T100 of the measured temperature information T that is obtained by the temperature measuring module 3 of the food temperature measuring device D gradually approaches the food cooked temperature of the predetermined food F, a flicker frequency of the light source generated by one of the first green light emitting element 41G, the second green light emitting element 42G, and the third green light emitting element 43G, or one of the first red light emitting element 41R, the second red light emitting element 42R, and the third red light emitting element 43R is gradually increased. However, the aforementioned details are disclosed for exemplary purposes only, and are not meant to limit the scope of the present disclosure.

Third Embodiment

Figure 5:
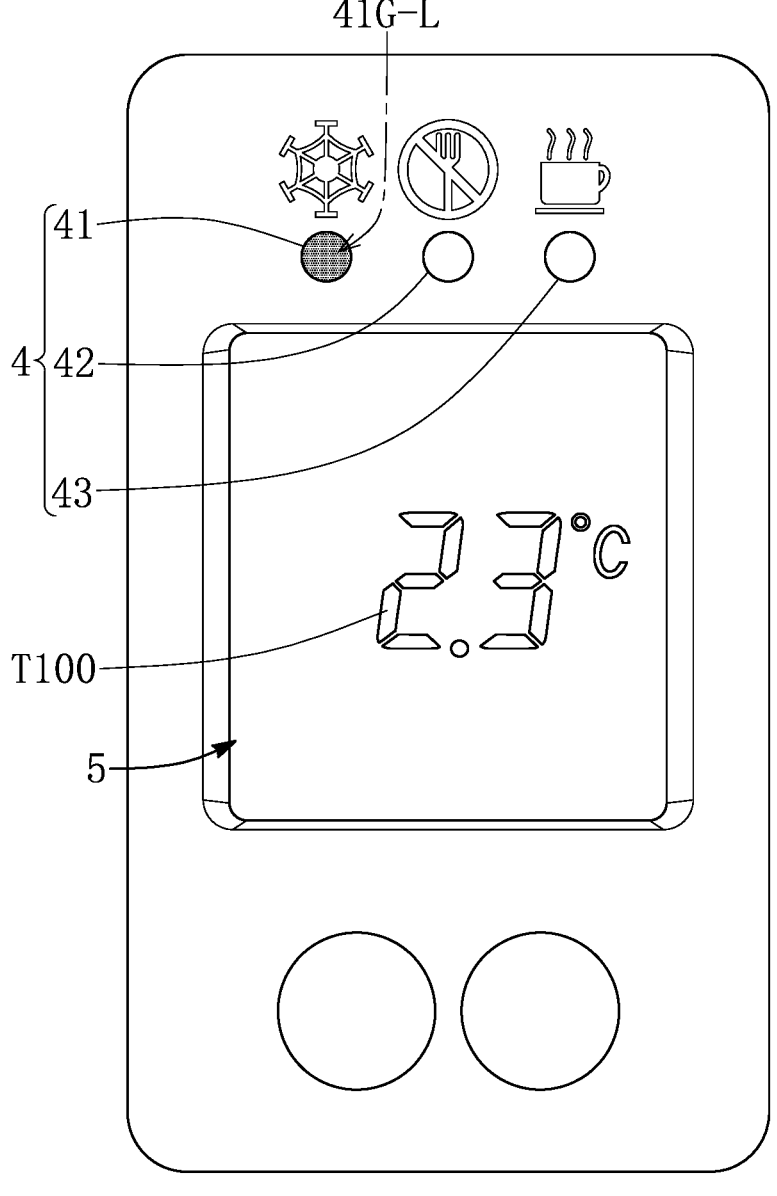
FIG. 5 is a schematic view of the light emitting display module of the food temperature measuring device configured for generating the first green light source by a first green light emitting element according to the first embodiment of the present disclosure.
Figure 6:
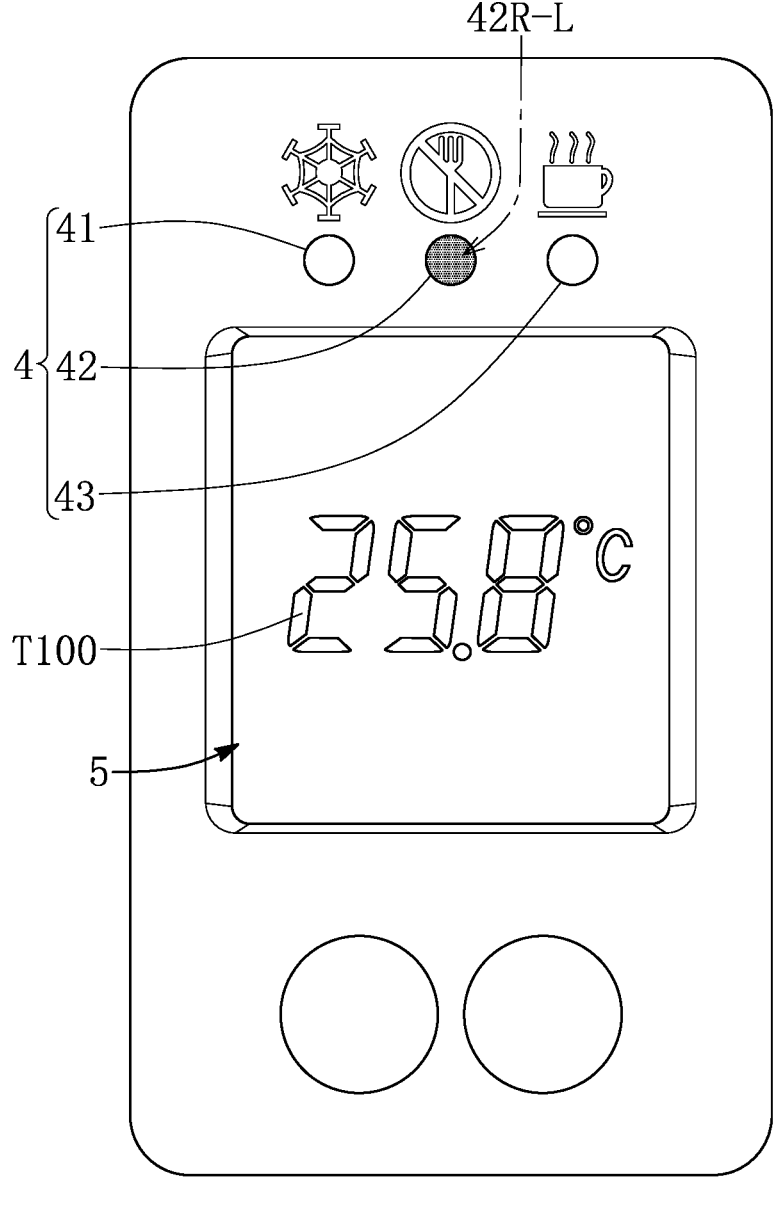
FIG. 6 is a schematic view of the light emitting display module of the food temperature measuring device configured for generating a second red light source by a second red light emitting element according to the first embodiment of the present disclosure.
Figure 7:
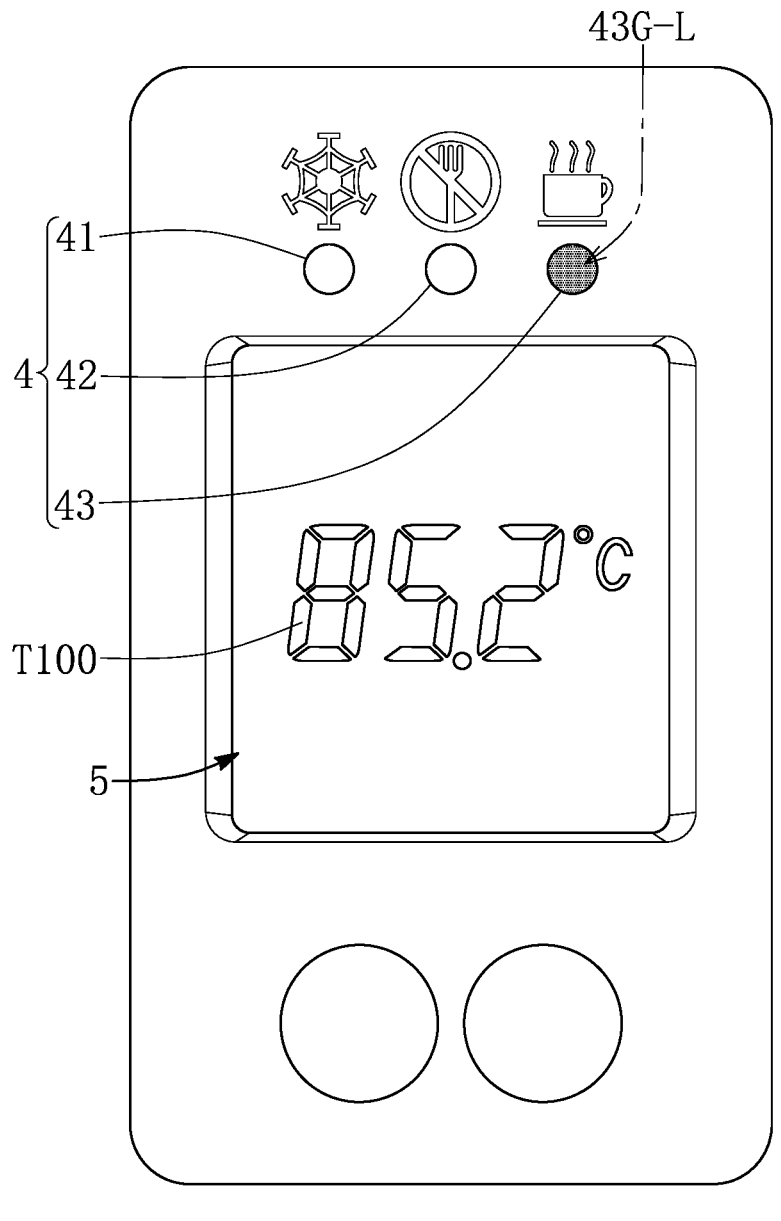
FIG. 7 is a schematic view of the light emitting display module of the food temperature measuring device configured for generating the third green light source by a third green light emitting element according to the first embodiment of the present disclosure.

Referring to FIG. 10 to FIG. 14, a third embodiment of the present disclosure provides a food temperature measuring device D, which includes a device main body 1, a signal control module 2, a temperature measuring module 3, a light emitting display module 4, and an information display module 5. Comparing FIG. 10 with FIG. 1, comparing FIG. 11 with FIG. 2, comparing FIG. 12 with FIG. 5, comparing FIG. 13 with FIG. 6, and comparing FIG. 14 with FIG. 7, the main difference between the third embodiment and the first embodiment is as follows: in the third embodiment, the information display module 5 can be configured for providing background color information 50M that can be displayed by a first color backlight or a second color backlight (that is to say, the information display module 5 can selectively use the first color backlight or the second color backlight to generate the background color information 50M).

Figure 11:
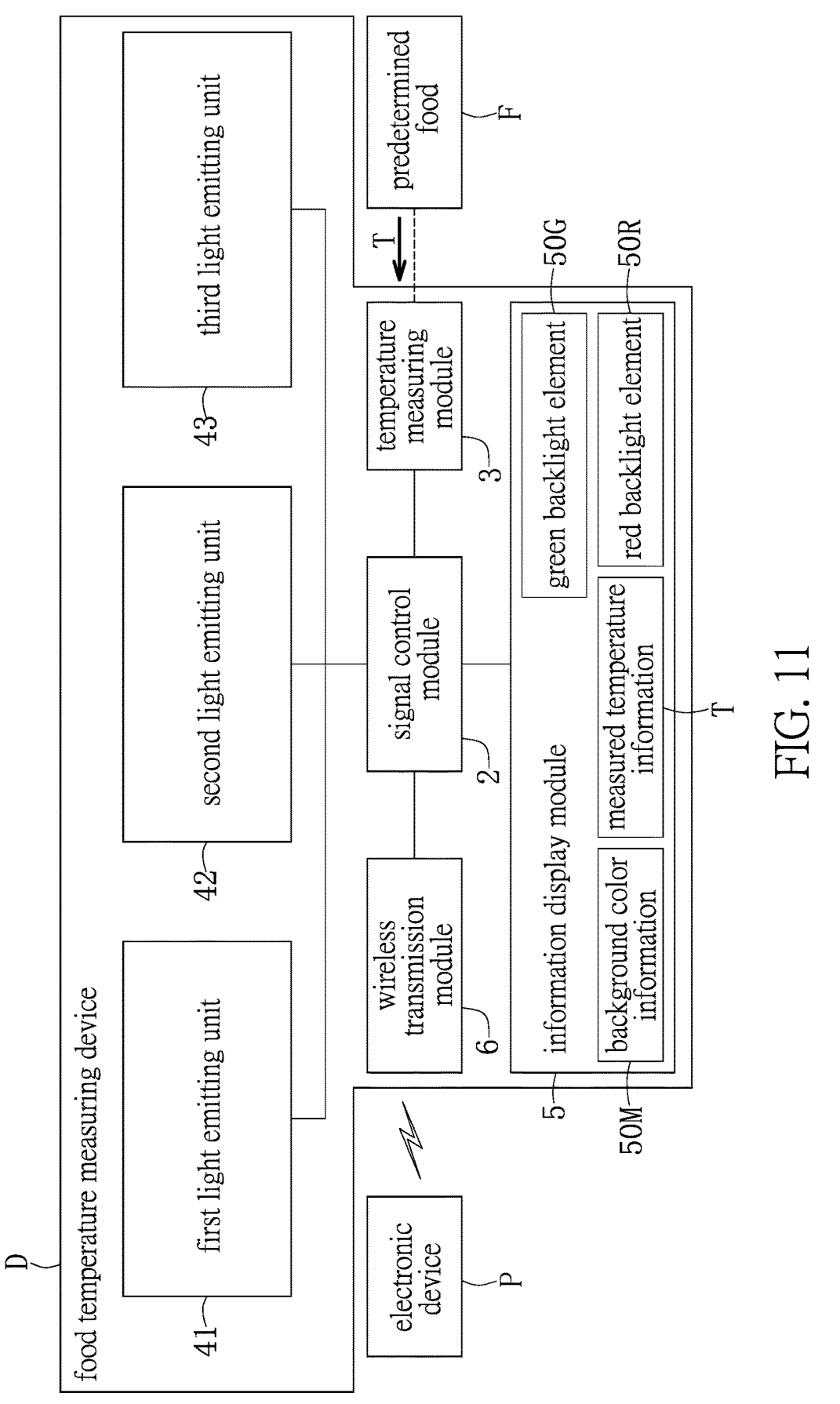
FIG. 11 is a functional block diagram of the food temperature measuring device according to the third embodiment of the present disclosure.
Figure 13:
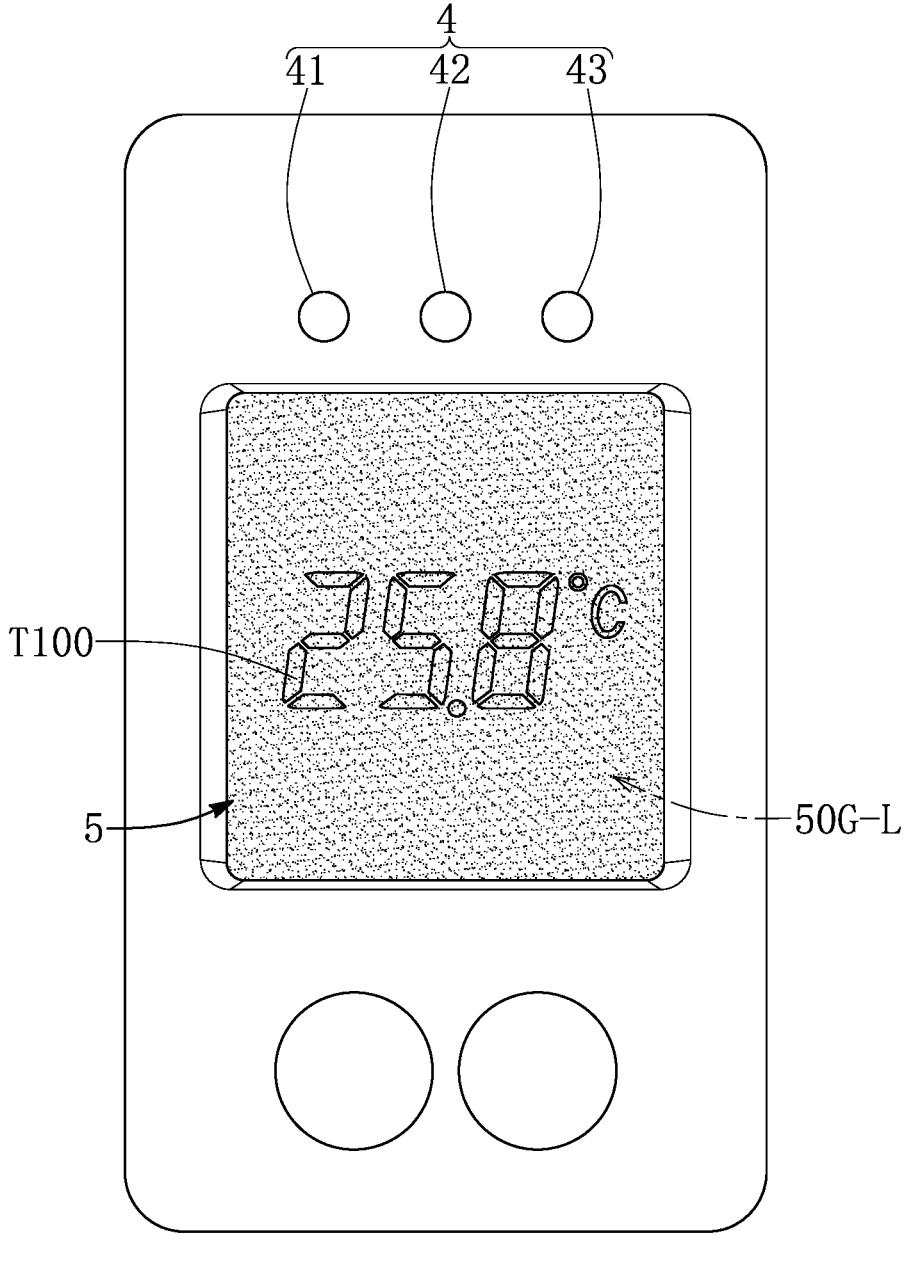
FIG. 13 is a schematic view of the information display module of the food temperature measuring device configured for generating a green backlight source by a green backlight element (when the measured temperature value ranges from 4° C. to 60° C.) according to the third embodiment of the present disclosure.

More particularly, referring to FIG. 11 and FIG. 13, when the measured temperature value T100 of the measured temperature information T that is obtained or measured by the temperature measuring module 3 falls within a safe temperature range, the first color backlight can be shown on the information display module 5 for displaying the background color information 50M. For example, the first color backlight can be a green backlight source 50G-L that is generated by a green backlight element 50G of the information display module 5, and the safe temperature range ranges from 4° C. to 60° C. according to the specification of HACCP. That is to say, when the measured temperature value T100 of the measured temperature information T that is obtained by the temperature measuring module 3 falls within the range from 4° C. to 60° C. (as shown in FIG. 13), the green backlight source 50G-L that is generated by the green backlight element 50G of the information display module 5 can serve as the first color backlight for displaying the background color information 50M on the information display module 5. However, the aforementioned details are disclosed for exemplary purposes only, and are not meant to limit the scope of the present disclosure.

Figure 12:
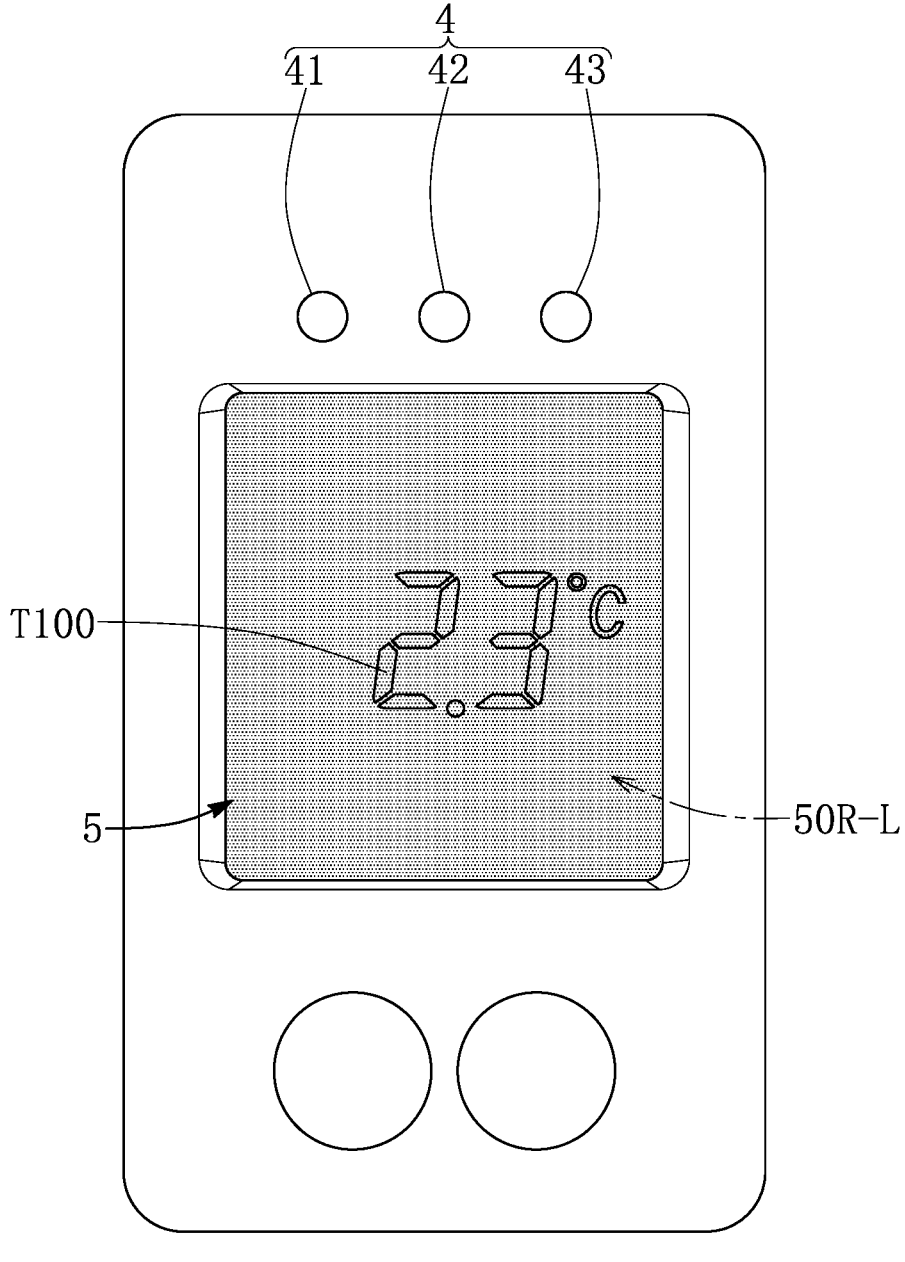
FIG. 12 is a schematic view of an information display module of the food temperature measuring device configured for generating a red backlight source by a red backlight element (when the measured temperature value is less than 4° C.) according to the third embodiment of the present disclosure.
Figure 14:
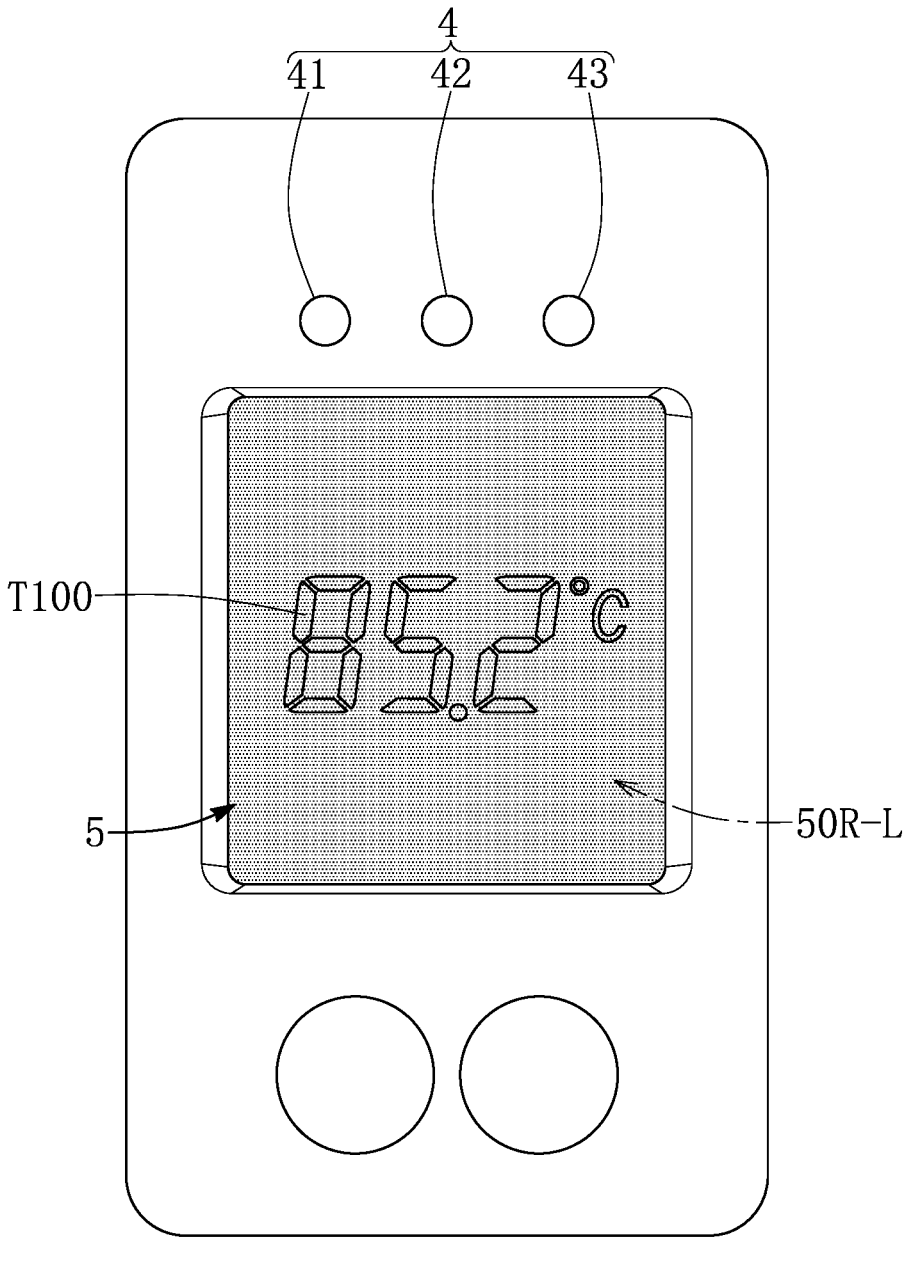
FIG. 14 is a schematic view of the information display module of the food temperature measuring device configured for generating the red backlight source by the red backlight element (when the measured temperature value is greater than 60° C.) according to the third embodiment of the present disclosure.

More particularly, referring to FIG. 11, FIG. 12 and FIG. 14, when the measured temperature value T100 of the measured temperature information T that is obtained or measured by the temperature measuring module 3 falls within an unsafe temperature range, the second color backlight can be shown on the information display module 5 for displaying the background color information 50M. For example, the second color backlight can be a red backlight source 50R-L that is generated by a red backlight element 50R of the information display module 5, and the unsafe temperature range can be less than 4° C. and greater than 60° C. according to the specification of HACCP. That is to say, when the measured temperature value T100 of the measured temperature information T that is obtained by the temperature measuring module 3 falls within the range that is less than 4° C. (as shown in FIG. 12) or is greater than 60° C. (as shown in FIG. 14), the red backlight source 50R-L that is generated by the red backlight element 50R of the information display module 5 can serve as the second color backlight for displaying the background color information 50M on the information display module 5. However, the aforementioned details are disclosed for exemplary purposes only, and are not meant to limit the scope of the present disclosure.

Figure 10:
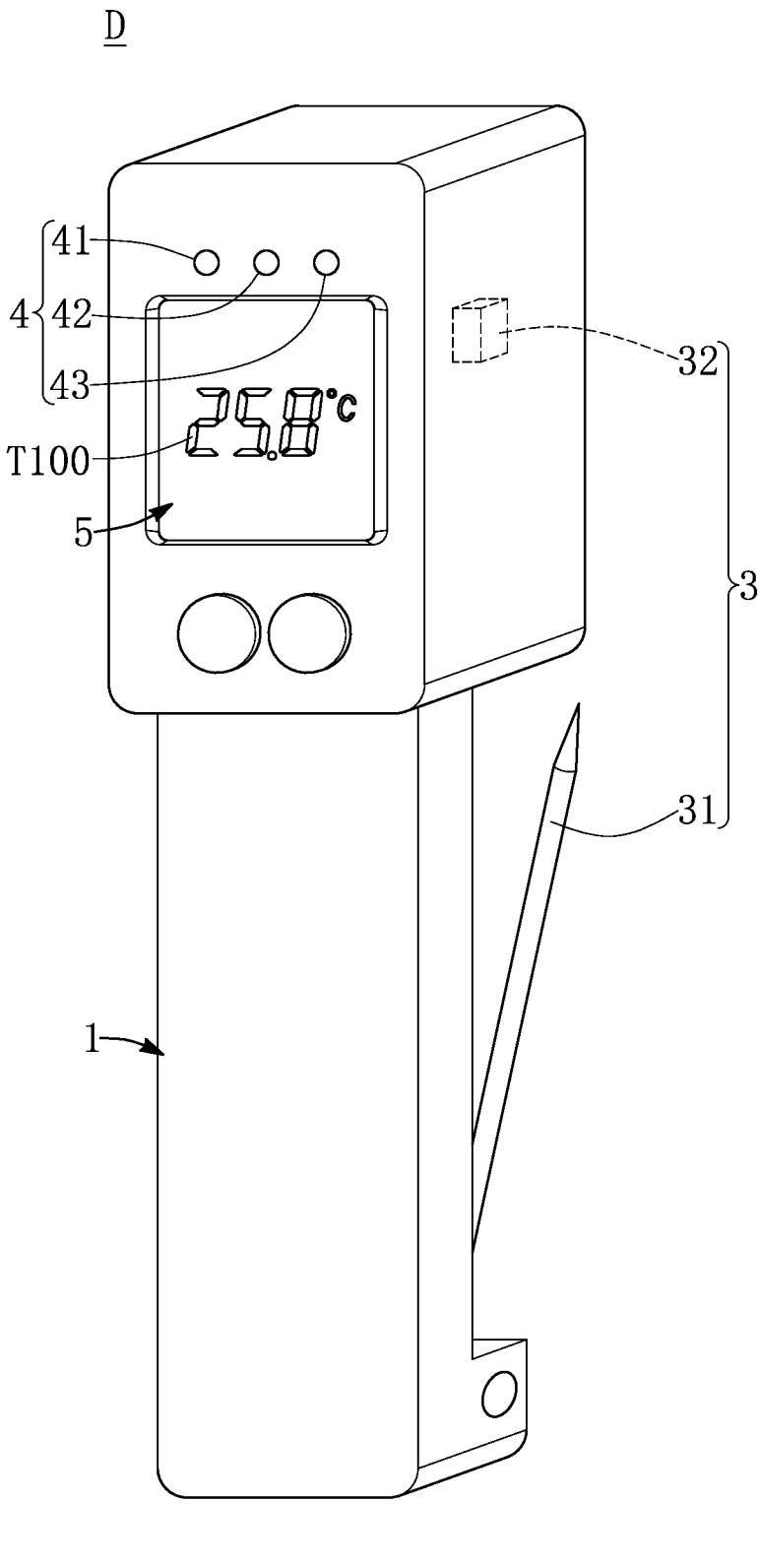
FIG. 10 is a schematic perspective view of the food temperature measuring device according to a third embodiment of the present disclosure.

It should be noted that, as shown in FIG. 10, the background color information 50M that is provided by the information display module 5 can be configured for indicating the measured temperature value T100 of the measured temperature information T is within the safe temperature range or the unsafe temperature range, so that the frozen pattern, the inedible pattern, and the edible pattern that are printed on the device main body 1 can be omitted (or the frozen pattern, the inedible pattern, and the edible pattern that are printed on the device main body 1 can be remained according to different requirements). In addition, as shown in FIG. 11, the wireless transmission module 6 can be configured to transmit the background color information 50M to an electronic device P so as to record usage state information of the food temperature measuring device D.

Beneficial Effects of the Embodiments

In conclusion, in the food temperature measuring device D provided by the present disclosure, by virtue of the temperature measuring module 3 being configured for measuring a predetermined food F so as to obtain measured temperature information T of the predetermined food F, the information display module 5 being configured for displaying a measured temperature value T100 of the measured temperature information T that is obtained by the temperature measuring module 3, and the light emitting display module 4 including a first light emitting unit 41 for providing a first food light message 41M, a second light emitting unit 42 for providing a second food light message 42M, and a third light emitting unit 43 for providing a third food light message 43M, the light emitting display module 4 can be configured for providing food category corresponding information corresponding to the predetermined food F according to the first food light message, the second food light message, and the third food light message 43M.

Furthermore, in the food temperature measuring device D provided by the present disclosure, by virtue of the temperature measuring module 3 being configured for measuring a predetermined food F so as to obtain measured temperature information T of the predetermined food F, the information display module 5 being configured for displaying a measured temperature value T100 of the measured temperature information T that is obtained by the temperature measuring module 3, and the information display module 5 being configured for providing background color information 50M that is displayed by a first color backlight or a second color backlight, when the measured temperature value T100 of the measured temperature information T that is obtained by the temperature measuring module 3 falls within a safe temperature range, the first color backlight can be shown on the information display module 5 for displaying the background color information 50M, and when the measured temperature value T100 of the measured temperature information T that is obtained by the temperature measuring module 3 falls within an unsafe temperature range, the second color backlight can be shown on the information display module 5 for displaying the background color information 50M.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A food temperature measuring device, comprising:
a device main body;
a signal control module disposed inside the device main body;
a temperature measuring module disposed on the device main body and electrically connected to the signal control module, for measuring a predetermined food so as to obtain measured temperature information of the predetermined food;
a light emitting display module disposed on the device main body and electrically connected to the signal control module; and
an information display module disposed on the device main body and electrically connected to the signal control module, for displaying a measured temperature value of the measured temperature information that is obtained by the temperature measuring module without using a knob setting;
wherein the light emitting display module includes a first light emitting unit for providing a first food light message, a second light emitting unit for providing a second food light message, and a third light emitting unit for providing a third food light message, and the light emitting display module is configured for providing food category corresponding information corresponding to the predetermined food according to the first food light message, the second food light message, and the third food light message;
wherein the information display module is configured for providing background color information that is displayed by a first color backlight or a second color backlight; and
wherein the first color backlight is a green backlight source generated by a green backlight element of the information display module to indicate a safe temperature range ranging from 4° C. to 60° C.

2. The food temperature measuring device according to claim 1,
wherein the first food light message provided by the first light emitting unit includes a first food light turn-on message for indicating that the first light emitting unit has been turned on, and a first food light turn-off message for indicating that the first light emitting unit has been turned off;
wherein the second food light message provided by the second light emitting unit includes a second food light turn-on message for indicating that the second light emitting unit has been turned on, and a second food light turn-off message for indicating that the second light emitting unit has been turned off;
wherein the third food light message provided by the third light emitting unit includes a third food light turn-on message for indicating that the third light emitting unit has been turned on, and a third food light turn-off message for indicating that the third light emitting unit has been turned off;
wherein the food category corresponding information provided by the light emitting display module includes one of the first food light turn-on message and the first food light turn-off message that are provided by the first light emitting unit, one of the second food light turn-on message and the second food light turn-off message that are provided by the second light emitting unit, and one of the third food light turn-on message and the third food light turn-off message that are provided by the third light emitting unit;
wherein the first light emitting unit includes a first green light emitting element for providing the first food light message, the second light emitting unit includes a red light emitting element, and a second green light emitting element for providing the second food light message, and the third light emitting unit includes a third green light emitting element for providing the third food light message;

wherein the first food light turn-on message is a first green light source generated by the first green light emitting element, the second food light turn-on message is a second green light source generated by the second green light emitting element, and the third food light turn-on message is a third green light source generated by the third green light emitting element;

wherein the light emitting display module is configured for providing the food category corresponding information corresponding to the predetermined food by turning on or off the first green light emitting element, turning on or off the second green light emitting element, and turning on or off the third green light emitting element;

wherein the food temperature measuring device is configured to define a food cooked temperature corresponding to the predetermined food by setting the first light emitting unit, the second light emitting unit, and the third light emitting unit, and when the measured temperature value of the measured temperature information that is obtained by the temperature measuring module gradually approaches the food cooked temperature of the predetermined food, a flicker frequency that is generated by one of the first green light emitting element, the second green light emitting element, and the third green light emitting element is gradually increased.

3. The food temperature measuring device according to claim 1, wherein the first food light message provided by the first light emitting unit includes a first food light turn-on message for indicating that the first light emitting unit has been turned on, and a first food light turn-off message for indicating that the first light emitting unit has been turned off;

wherein the second food light message provided by the second light emitting unit includes a second food light turn-on message for indicating that the second light emitting unit has been turned on, and a second food light turn-off message for indicating that the second light emitting unit has been turned off;

wherein the third food light message provided by the third light emitting unit includes a third food light turn-on message for indicating that the third light emitting unit has been turned on, and a third food light turn-off message for indicating that the third light emitting unit has been turned off;

wherein the food category corresponding information provided by the light emitting display module includes one of the first food light turn-on message and the first food light turn-off message that are provided by the first light emitting unit, one of the second food light turn-on message and the second food light turn-off message that are provided by the second light emitting unit, and one of the third food light turn-on message and the third food light turn-off message that are provided by the third light emitting unit;

wherein the first light emitting unit includes a first green light emitting element for providing the first food light message, and a first red light emitting element for providing the first food light message, the second light emitting unit includes a second green light emitting element for providing the second food light message, and a second red light emitting element for providing the second food light message, and the third light emitting unit includes a third green light emitting element for providing the third food light message, and a third red light emitting element for providing the third food light message;

wherein, when the first food light turn-on message is a first green light source generated by the first green light emitting element, the second food light turn-on message is a second green light source generated by the second green light emitting element, and the third food light turn-on message is a third green light source generated by the third green light emitting element, the light emitting display module is configured for providing the food category corresponding information corresponding to the predetermined food by turning on or off the first green light emitting element, turning on or off the second green light emitting element, and turning on or off the third green light emitting element;

wherein, when the first food light turn-on message is a first red light source generated by the first red light emitting element, the second food light turn-on message is a second red light source generated by the second red light emitting element, and the third food light turn-on message is a third red light source generated by the third red light emitting element, the light emitting display module is configured for providing the food category corresponding information corresponding to the predetermined food by turning on or off the first red light emitting element, turning on or off the second red light emitting element, and turning on or off the third red light emitting element;

wherein the food temperature measuring device is configured to define a food cooked temperature corresponding to the predetermined food by setting the first light emitting unit, the second light emitting unit, and the third light emitting unit, and when the measured temperature value of the measured temperature information that is obtained by the temperature measuring module gradually approaches the food cooked temperature of the predetermined food, a flicker frequency that is generated by one of the first green light emitting element, the second green light emitting element, and the third green light emitting element, or one of the first red light emitting element, the second red light emitting element, and the third red light emitting element is gradually increased.

4. The food temperature measuring device according to claim 1, further comprising a wireless transmission module disposed on the device main body and electrically connected to the signal control module;

wherein and the wireless transmission module is configured to transmit the measured temperature information, the background color information, and the food category corresponding information to an electronic device;

wherein the temperature measuring module includes a contact temperature measuring probe disposed on the device main body, and a noncontact temperature measuring probe disposed inside the device main body;

wherein, when the measured temperature value of the measured temperature information that is obtained by the temperature measuring module falls within a safe temperature range, the first color backlight is shown on the information display module for displaying the background color information;

wherein, when the measured temperature value of the measured temperature information that is obtained by the temperature measuring module falls within an unsafe temperature range, the second color backlight is shown on the information display module for displaying the background color information;

wherein the second color backlight is a red backlight source generated by a red backlight element of the information display module, and the unsafe temperature range is less than 4° C. or greater than 60° C.

5. The food temperature measuring device according to claim 1, wherein the first light emitting unit is configured for providing a first food temperature message, the second light emitting unit is configured for providing a second food temperature message, and the third light emitting unit is configured for providing a third food temperature message;

wherein the first light emitting unit includes a first green light emitting element configured for providing the first food temperature message, the second light emitting unit includes a second green light emitting element configured for providing the second food temperature message, and a red light emitting element configured for providing the second food temperature message, and the third light emitting unit includes a third green light emitting element configured for providing the third food temperature message;

wherein, when the measured temperature value of the measured temperature information is less than 4° C., the first green light emitting element is turned on for generating a first green light source, and the second green light emitting element, the red light emitting element, and the third green light emitting element are turned off;

wherein, when the measured temperature value of the measured temperature information is between 4° C. and 60° C., the red light emitting element is turned on for generating a red light source, and the first green light emitting element, the second green light emitting element, and the third green light emitting element are turned off;

wherein, when the measured temperature value of the measured temperature information is greater than 60° C., the third green light emitting element is turned on for generating a third green light source, and the first green light emitting element, the second green light emitting element, and the red light emitting element are turned off.

6. A food temperature measuring device, comprising:
a device main body;
a signal control module disposed inside the device main body;
a temperature measuring module disposed on the device main body and electrically connected to the signal control module, for measuring a predetermined food so as to obtain measured temperature information of the predetermined food;
a light emitting display module disposed on the device main body and electrically connected to the signal control module; and
an information display module disposed on the device main body and electrically connected to the signal control module, for displaying a measured temperature value of the measured temperature information that is obtained by the temperature measuring module without using a knob setting, and for providing background color information that is displayed by a first color backlight or a second color backlight;

wherein, when the measured temperature value of the measured temperature information that is obtained by the temperature measuring module falls within a safe temperature range, the first color backlight is shown on the information display module for displaying the background color information;

wherein, when the measured temperature value of the measured temperature information that is obtained by the temperature measuring module falls within an unsafe temperature range, the second color backlight is shown on the information display module for displaying the background color information; and wherein the second color backlight is a red backlight source generated by a red backlight element of the information display module to indicate an unsafe temperature range being less than 4° C. or greater than 60° C.

7. The food temperature measuring device according to claim 6, wherein the light emitting display module includes a first light emitting unit for providing a first food light message, a second light emitting unit for providing a second food light message, and a third light emitting unit for providing a third food light message, and the light emitting display module is configured for providing food category corresponding information corresponding to the predetermined food according to the first food light message, the second food light message, and the third food light message;

wherein the first food light message provided by the first light emitting unit includes a first food light turn-on message for indicating that the first light emitting unit has been turned on, and a first food light turn-off message for indicating that the first light emitting unit has been turned off;

wherein the second food light message provided by the second light emitting unit includes a second food light turn-on message for indicating that the second light emitting unit has been turned on, and a second food light turn-off message for indicating that the second light emitting unit has been turned off;

wherein the third food light message provided by the third light emitting unit includes a third food light turn-on message for indicating that the third light emitting unit has been turned on, and a third food light turn-off message for indicating that the third light emitting unit has been turned off;

wherein the food category corresponding information provided by the light emitting display module includes one of the first food light turn-on message and the first food light turn-off message that are provided by the first light emitting unit, one of the second food light turn-on message and the second food light turn-off message that are provided by the second light emitting unit, and one of the third food light turn-on message and the third food light turn-off message that are provided by the third light emitting unit;

wherein the first light emitting unit includes a first green light emitting element for providing the first food light message, the second light emitting unit includes a red light emitting element, and a second green light emitting element for providing the second food light message, and the third light emitting unit includes a third green light emitting element for providing the third food light message;

wherein the first food light turn-on message is a first green light source generated by the first green light emitting element, the second food light turn-on message is a second green light source generated by the second green light emitting element, and the third food light turn-on message is a third green light source generated by the third green light emitting element;

wherein the light emitting display module is configured for providing the food category corresponding information corresponding to the predetermined food by turning on or off the first green light emitting element, turning on or off the second green light emitting element, and turning on or off the third green light emitting element;

wherein the food temperature measuring device is configured to define a food cooked temperature corresponding to the predetermined food by setting the first light emitting unit, the second light emitting unit, and the third light emitting unit, and when the measured temperature value of the measured temperature information that is obtained by the temperature measuring module gradually approaches the food cooked temperature of the predetermined food, a flicker frequency that is generated by one of the first green light emitting element, the second green light emitting element, and the third green light emitting element is gradually increased.

8. The food temperature measuring device according to claim 6, wherein the light emitting display module includes a first light emitting unit for providing a first food light message, a second light emitting unit for providing a second food light message, and a third light emitting unit for providing a third food light message, and the light emitting display module is configured for providing food category corresponding information corresponding to the predetermined food according to the first food light message, the second food light message, and the third food light message;

wherein the first food light message provided by the first light emitting unit includes a first food light turn-on message for indicating that the first light emitting unit has been turned on, and a first food light turn-off message for indicating that the first light emitting unit has been turned off;

wherein the second food light message provided by the second light emitting unit includes a second food light turn-on message for indicating that the second light emitting unit has been turned on, and a second food light turn-off message for indicating that the second light emitting unit has been turned off;

wherein the third food light message provided by the third light emitting unit includes a third food light turn-on message for indicating that the third light emitting unit has been turned on, and a third food light turn-off message for indicating that the third light emitting unit has been turned off;

wherein the food category corresponding information provided by the light emitting display module includes one of the first food light turn-on message and the first food light turn-off message that are provided by the first light emitting unit, one of the second food light turn-on message and the second food light turn-off message that are provided by the second light emitting unit, and one of the third food light turn-on message and the third food light turn-off message that are provided by the third light emitting unit;

wherein the first light emitting unit includes a first green light emitting element for providing the first food light message, and a first red light emitting element for providing the first food light message, the second light emitting unit includes a second green light emitting element for providing the second food light message, and a second red light emitting element for providing the second food light message, and the third light emitting unit includes a third green light emitting element for providing the third food light message, and a third red light emitting element for providing the third food light message;

wherein, when the first food light turn-on message is a first green light source generated by the first green light emitting element, the second food light turn-on message is a second green light source generated by the second green light emitting element, and the third food light turn-on message is a third green light source generated by the third green light emitting element, the light emitting display module is configured for providing the food category corresponding information corresponding to the predetermined food by turning on or off the first green light emitting element, turning on or off the second green light emitting element, and turning on or off the third green light emitting element;

wherein, when the first food light turn-on message is a first red light source generated by the first red light emitting element, the second food light turn-on message is a second red light source generated by the second red light emitting element, and the third food light turn-on message is a third red light source generated by the third red light emitting element, the light emitting display module is configured for providing the food category corresponding information corresponding to the predetermined food by turning on or off the first red light emitting element, turning on or off the second red light emitting element, and turning on or off the third red light emitting element;

wherein the food temperature measuring device is configured to define a food cooked temperature corresponding to the predetermined food by setting the first light emitting unit, the second light emitting unit, and the third light emitting unit, and when the measured temperature value of the measured temperature information that is obtained by the temperature measuring module gradually approaches the food cooked temperature of the predetermined food, a flicker frequency that is generated by one of the first green light emitting element, the second green light emitting element, and the third green light emitting element, or one of the first red light emitting element, the second red light emitting element, and the third red light emitting element is gradually increased.

9. The food temperature measuring device according to claim 6, further comprising a wireless transmission module disposed on the device main body and electrically connected to the signal control module;

wherein the wireless transmission module is configured to transmit the measured temperature information and the background color information to an electronic device;

wherein the temperature measuring module includes a contact temperature measuring probe disposed on the device main body, and a noncontact temperature measuring probe disposed inside the device main body;

wherein the first color backlight is a green backlight source generated by a green backlight element of the information display module, and the safe temperature range ranges from 4° C. to 60° C.

10. The food temperature measuring device according to claim 6, wherein the first light emitting unit is configured for providing a first food temperature message, the second light emitting unit is configured for providing a second food temperature message, and the third light emitting unit is configured for providing a third food temperature message;

wherein the first light emitting unit includes a first green light emitting element configured for providing the first food temperature message, the second light emitting unit includes a second green light emitting element configured for providing the second food temperature message, and a red light emitting element configured for providing the second food temperature message, and the third light emitting unit includes a third green light emitting element configured for providing the third food temperature message;

wherein, when the measured temperature value of the measured temperature information is less than 4° C., the first green light emitting element is turned on for generating a first green light source, and the second green light emitting element, the red light emitting element, and the third green light emitting element are turned off;

wherein, when the measured temperature value of the measured temperature information is between 4° C. and 60° C., the red light emitting element is turned on for generating a red light source, and the first green light emitting element, the second green light emitting element, and the third green light emitting element are turned off;

wherein, when the measured temperature value of the measured temperature information is greater than 60° C., the third green light emitting element is turned on for generating a third green light source, and the first green light emitting element, the second green light emitting element, and the red light emitting element are turned off.

11. The food temperature measuring device according to claim 6, wherein, when a placement orientation of the information display module is changed according to different measurement angles of the food temperature measuring device, a screen orientation of an information display image provided by the information display module is changed following a change of the placement orientation of the information display module.

12. The food temperature measuring device according to claim 1, wherein the temperature measuring module includes a noncontact temperature measuring probe disposed inside the device main body.

13. The food temperature measuring device according to claim 1, wherein the second color backlight is a red backlight source generated by a red backlight element of the information display module to indicate an unsafe temperature range being less than 4° C. or greater than 60° C.

14. The food temperature measuring device according to claim 1, wherein the first light emitting unit includes a first green light emitting element, the second light emitting unit includes a second green light emitting element, and a red light emitting element configured, and the third light emitting unit includes a third green light emitting element; and wherein, when the measured temperature value of the measured temperature information is between 4° C. and 60° C., the red light emitting element is turned on for generating a red light source, and the first green light emitting element, the second green light emitting element, and the third green light emitting element are turned off.

15. The food temperature measuring device according to claim 6, wherein the temperature measuring module includes a noncontact temperature measuring probe disposed inside the device main body.

16. The food temperature measuring device according to claim 15, wherein the first color backlight is a green backlight source generated by a green backlight element of the information display module to indicate a safe temperature range ranging from 4° C. to 60° C.

17. The food temperature measuring device according to claim 6, wherein the first light emitting unit includes a first green light emitting element, the second light emitting unit includes a second green light emitting element, and a red light emitting element configured, and the third light emitting unit includes a third green light emitting element; and wherein, when the measured temperature value of the measured temperature information is between 4° C. and 60° C., the red light emitting element is turned on for generating a red light source, and the first green light emitting element, the second green light emitting element, and the third green light emitting element are turned off.

* * * * *